United States Patent [19]

Hoffner et al.

[11] Patent Number: 4,702,776

[45] Date of Patent: Oct. 27, 1987

[54] PREPARATION OF PIGMENTARY RED IRON OXIDES

[75] Inventors: Daniel A. E. Hoffner; Jean-Marie C. Trautmann, both of Thann, France

[73] Assignee: Thann et Mulhouse, Thann-Haut-Rhin, France

[21] Appl. No.: 716,540

[22] Filed: Mar. 27, 1985

[30] Foreign Application Priority Data

Mar. 27, 1984 [FR] France .................................. 8405175

[51] Int. Cl.⁴ ................................................ C09C 3/00
[52] U.S. Cl. ..................................... 106/309; 106/304
[58] Field of Search ................................. 106/304, 309

[56] References Cited

U.S. PATENT DOCUMENTS

| | | | |
|---|---|---|---|
| 1,337,402 | 4/1920 | Hemingway | 423/633 |
| 2,416,138 | 2/1947 | Ayers | 423/633 |
| 2,785,991 | 3/1957 | Benneteh | 106/304 |
| 3,276,894 | 10/1966 | Hund et al. | 106/304 |
| 3,471,258 | 10/1969 | Brixner | 106/304 |
| 4,139,398 | 2/1979 | Pellizzon et al. | 106/304 |
| 4,145,228 | 3/1979 | Croee et al. | 106/304 |
| 4,153,472 | 5/1979 | Pellizzon et al. | 106/304 |
| 4,201,762 | 5/1980 | Daly | 106/304 |
| 4,234,348 | 11/1980 | Brunn et al. | 106/304 |

Primary Examiner—Paul Lieberman
Assistant Examiner—Willie J. Thompson
Attorney, Agent, or Firm—Burns, Doane, Swecker & Mathis

[57] ABSTRACT

Pigmentary red iron oxide particulates essentially devoid of manganese impurities and ranging in shade from the orange-reds to the purplish reds, are conveniently prepared by (1) calcining, even at higher temperatures, an intimate admixture of (i) a ferrous sulfate hydrate containing contaminating amounts of manganese values, e.g., a by-product stream of ferrous sulfate, and (ii) an alkali metal compound, said admixture comprising from 0.08 to 1 gram-atom of alkali metal per mole of $Fe_2O_3$ produced, (2) washing the calcined admixture with water to remove essentially all water-soluble manganese values therefrom, and advantageously (3) drying and (4) grinding the calcined and washed admixture.

23 Claims, 1 Drawing Figure

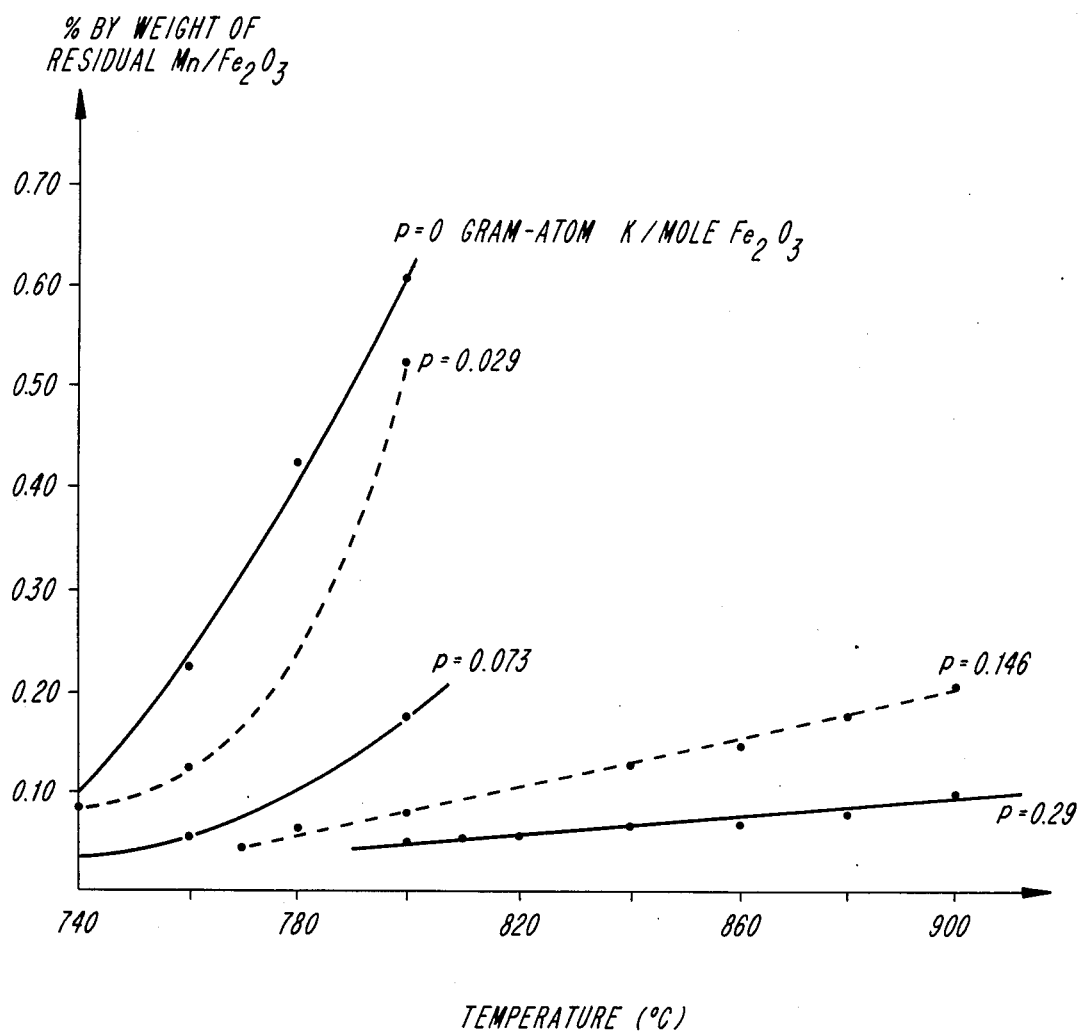

PREPARATION OF PIGMENTARY RED IRON OXIDES

BACKGROUND OF THE INVENTION

1. Field of the Invention:

The present invention relates to the preparation of pigmentary red $Fe_2O_3$ and, more especially, to the preparation of such oxides by calcination, particularly, of a hydrated ferrous sulfate comprising contaminating amounts of manganese values.

2. Description of the Prior Art:

A wide variety of processes for the production of pigmentary red iron oxides by calcination of ferrous sulfate have long been known to this art. Calcination is an attractive proposition from an economic point of view only if the raw material is inexpensive; it is for this reason that most typically residual ferrous sulfate starting materials are used. These emanate from such process streams as, for example, the sulfuric acid pickling of steel sheets, or from sulfate process titanium dioxide. In both cases, the iron is accompanied by various metal impurities which, unless particular precautions are taken, are transferred into the haematite $\alpha Fe_2O_3$ which is formed during the calcination operation, and impair the color purity of the finished pigment. As a practical matter, manganese is one of the impurities which is most deleterious.

French Pat. No. 744,777 describes a process for producing red iron oxides which are free of foreign cations. That process entails crystallization of the double salt $FeSO_4.Na_2SO_4.4H_2O$. However, the yield of iron does not exceed 40%; 60% of the iron is found in the aqueous effluent.

French Pat. No. 2,438,075 describes a process for separating manganese and most of the metal impurities, thus providing $Fe_2O_3$ having excellent pigmentary characteristics. This particular process involves double calcination and an intermediate washing with water, in the course of which the metal impurities and a fraction of the iron values are eliminated. However, the necessity for a second calcination step detrimentally affects the cost of the finished pigment. Furthermore, approximately 10% of the iron is lost in the washing operation which is carried out between the two calcination steps.

U.S. Pat. No. 1,337,402 describes a process wherein the constituents of a stoichiometric mixture of ferrous sulfate and an alkali metal compound, such as sodium carbonate, are interreacted, in the course of crushing them together in the dry state.

The process of the '402 patent thus seeks to prevent the evolution of sulfur oxides during the subsequent calcination operation, and it produces a mixture of iron oxide and alkali metal sulfate. Such process is not economical because of the substantial amount of alkali metal required: 4 gram-atoms of alkali metal per mole of $Fe_2O_3$ formed.

U.S. Pat. No. 2,416,138 discloses a process for producing $Fe_2O_3$ having a low Mn content, which comprises calcination at a temperature of from 704° to 845° C. (1300° to 1550° F.) of the ferrous sulfate to which an alkali metal salt is optionally added, followed by a washing with water to remove the major amount of the manganese values.

Nonetheless, the '138 patent only discloses the use of sodium chloride, and it is stated that a proportion by weight of 0.3% $NaCl/Fe_2O_3$ (namely, 0.008 mole of alkali metal per mole of $Fe_2O_3$) is the optimum value and that it is imperative for it to be maintained at levels of less than 3% (namely, 0.08 mole of alkali metal per mole of $Fe_2O_3$). Under those conditions, and in order to achieve satisfactory elimination of the manganese, the process must necessarily be carried out at a temperature of less than 845° C. Accordingly, the iron losses in the washing operation are quite substantial, attaining 10%. Moreover, certain grades of iron oxide, which require a calcination temperature of greater than 845° C., cannot be obtained by this process.

SUMMARY OF THE INVENTION

Accordingly, a major object of the present invention is the provision of an improved process for the preparation of red iron oxides of high pigment grade by calcination of ferrous sulfate containing contaminating amounts of manganese values, which sulfate notably comprises the by-product of the sulfuric acid pickling of steel plates or sheets, or the residual product emanating from the production of sulfate process titanium dioxide. The process according to the invention, moreover, enables the use of calcination temperatures of more than 845° C. and, accordingly, makes it possible to produce all grades and qualities of red iron oxides. In addition, any loss of iron values is less than 5%.

Briefly, the subject process features calcining ferrous sulfate containing contaminating amounts of manganese impurities at temperatures of from 700° to 960° C., washing the calcined product with water, then drying and crushing it. It is characterized in that a sodium or potassium compound is incorporated with the ferrous sulfate, before calcination, in a proportion of from 0.08 to 1, preferably from 0.08 to 0.40, gram atom of alkali metal per mole of $Fe_2O_3$.

BRIEF DESCRIPTION OF THE DRAWING

The Figures of Drawing is a graph demonstrating the effect of the amount of alkali metal compound incorporated on the decomposition temperature of manganese sulfate.

DETAILED DESCRIPTION OF THE INVENTION

More particularly according to the present invention, it is well known to this art that manganese is the most troublesome impurity which is contained in the residual or crude ferrous sulfates available for the production of pigmentary $Fe_2O_3$. When the amount of manganese exceeds 0.1% in the finished pigment, the tones of the pigment are degraded, especially as regards the orange shades.

Although manganese sulfate undergoes overall decomposition at a higher temperature than iron sulfate, the temperature ranges in which thermal decomposition of these two sulfates occurs overlap.

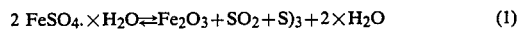

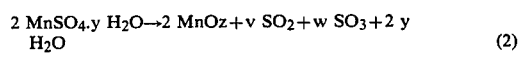

(with $2v + 3w + 2z = 8$ and $v + w = 2$)

Consequently, in the known art, substantial elimination of the manganese by washing, after a calcination operation requiring a relatively low temperature, is always accompanied by solubilization and loss of a substantial amount of the iron.

Surprisingly, it has now been found that the addition of compounds of sodium or potassium in well defined amounts advantageously shifts the temperature ranges in which decomposition of the iron and manganese sulfates occur. That means that, in the presence of such additives, it is possible to calcine the iron sulfate at up to 960° C. while at the same time retaining the major portion of the manganese in water-soluble form, that is to say, such that it can easily be removed by washing after calcination.

The influence or effect of addition of potassium salt on the manganese sulfate decomposition temperature is illustrated in the Figure of Drawing.

Ferrous sulfate containing manganese impurities, in an $Mn/Fe_2O_3$ ratio of 0.63% by weight, was mixed with a potassium salt in proportions:

$$p = \frac{\text{number of gram atoms of alkali metal}}{\text{moles of } Fe_2O_3}$$

of 0; 0.029; 0.073; 0.146; and 0.29. After partial dehydration of the mixture, it was calcined at temperatures of from 740° to 900° C. Upon completion of the calcination, the mixture was treated with water to remove the soluble components. The residual amounts of Mn, in dependence on the calcination temperature and the amount of K used, are reported in said Figure of Drawing.

It will be seen that with amounts of alkali metal as low (0.008 gram atom per mole of $Fe_2O_3$) as those disclosed in U.S. Pat. No. 2,416,138, the amount of Mn combined with the iron oxide increases almost as quickly with the temperature as in the absence of alkali metal. It too will be seen, on the other hand, that with 0.29 gram atom of alkali metal per mole of $Fe_2O_3$, it is possible to employ calcination temperatures of 900°, while maintaining a proportion of Mn of less than 10% in the finished pigment. It was also found in this case that the iron losses were limited to about 1%.

Similar results are obtained by adding a sodium compound.

Any sodium or potassium salt which is capable of being converted into a sulfate under the calcination conditions is suitable. Particularly representative are the hydroxides, carbonates, chlorides, nitrates and sulfates.

The addition of compounds of K or Na to the iron sulfate before calcination therefore permits the calcination operation to be carried out at higher temperatures, while retaining the major amount of the manganese values in watersoluble form. Now, the shade of a red iron oxide is governed by its particle size, which increases with the calcination temperature. It is therefore possible according to the present process to produce all shades of red by adjusting the calcination temperature without fear of contamination of the $Fe_2O_3$ formed by the Mn which is present.

It will also be appreciated that the amount of stabilizing agent must be adapted to the amount of Mn present in the raw material and to the shade of red which is to be produced. With the ferrous sulfate hereinbefore considered, it will be seen (the Figure of Drawing) that the role played by the potassium begins to be significant at from 0.08 gram-atom of alkali metal per mole of $Fe_2O_3$. In order to achieve shades which are the more blue and purple, and which require the highest calcination temperatures, it may be necessary to employ one mole of alkali metal per mole of $Fe_2O_3$ if the amount of Mn is very high. With the commercially available ferrous sulfates, it is possible in practice, in most cases, to achieve the complete range of colors required by the users of the pigment, by employing 0.08 to 0.4 gram-atom of alkali metal per mole of $Fe_2O_3$.

To avoid the formation of crusts and clogging in the calcination furnace, it is preferable for it to be charged with iron sulfate in the form of partially dehydrated granules. As intimate a mixture as possible of the stabilizing compound with the iron sulfate is formulated by any known method. Thus, it is possible, for example, to convert the initial salt into the monohydrate and to add thereto the sodium or potassium compound in aqueous solution. The amount of water added advantageously corresponds to the production of a mixture having the formula $FeSO_4.4H_2O$. That mixture first occurs in the form of a paste which is easy to homogenize and which then hardens by a process which is comparable to the setting of plaster. The resulting solid is then reduced to a state of hydration corresponding to $FeSO_4.H_2O$. The granules which will be used as feed for the furnace are produced by crushing and sieving the monohydrate, with the alkali metal compound having been added thereto.

The calcination is preferably carried out in an externally heated furnace by means of which it is possible to avoid diluting the sulfur oxides ($SO_2, SO_3$) with the heating gases ($CO_2, N_2, O_2$ in excess), and to use such oxides in the production of sulfuric acid.

The calcination may be improved if a certain amount of reducing agent (symbolically designated herein by the symbol "R"), such as carbon, sulfur or a hydrocarbon, is incorporated into the iron sulfate. The role played by the reducing agent is to displace the equilibrium (1) towards the right by removal of $SO_3$, in accordance with a reaction of the type:

$$SO_3 + R \rightarrow SO_2 + RO \qquad (3)$$

Advantageously, an amount of reducing agent is used which is from 1 to 1.5 times the stoichiometric amount. The preferred reducing agent is sulfur. In that case, the calcination may be represented as:

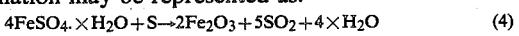
$$4FeSO_4.\times H_2O + S \rightarrow 2Fe_2O_3 + 5SO_2 + 4\times H_2O \qquad (4)$$

Apart from the parasitic effects of the intake of air, it will be seen that the use of sulfur makes it possible to produce gases which have a particularly high content in sulfur oxides, since, by virtue of using an indirectly heated furnace, the only dilution is produced by water vapor. Another advantage lies in the establishment of a non-oxidizing atmosphere which is favorable to good resistance of the refractory metal, it being advantageous to line the interior of the calcination furnace in order to facilitate heat exchange phenomena.

The use of sulfur is also particularly advantageous because, other than its beneficial effect on heat supply, the additional raw material costs are compensated for by the capacity for production of sulfuric acid.

The maximum temperature that the mixture is to reach in the calcination furnace depends, in particular, on the amount of manganese present, the amount of stabilizing additive incorporated with the ferrous sulfate, the residence time in the furnace, the additional presence of reducing agent and, to a large extent, the tone which is to be achieved in the finished pigment. Such temperature generally ranges from 700° to 960° C. The lowest temperatures result in orange-red pigments, the intermediate temperatures give neutral reds, while the highest temperatures give purplish reds.

The product obtained from the furnace outlet is in the form of granules which are similar in size to those of the dried iron sulfate which is initially introduced into the furnace, and primarily comprises $Fe_2O_3$ accompanied by less than 5% of iron values which have remained in the soluble state.

The washing of the calcined material is with water but, in order to more easily produce neutral pigments, it may be advantageous to complete the washing operation by an alkaline treatment, followed by a final washing with water.

The product, after having been washed and drained of excess liquid, is then dried. The drying operation does not entail any particular constraint and may be carried out, for example, in a belt-type dryer or a rotary furnace.

The dried pigment is then subjected to a crushing operation under those conditions usually employed in the mineral pigment industry. A micronization operation may optionally complete the crushing operation and ensure excellent dispersibility of the pigment in binding agents and an even higher degree of brilliancy in the lacquers which are pigmented with that oxide.

The present invention therefore provides the advantage of making it possible to produce a complete range of red iron oxides having a low manganese content from residual ferrous sulfate containing contaminating amounts of manganese values. The red pigments obtained accordingly have a very high degree of color purity. Their capability for coloration is superior to that of the best red $Fe_2O_3$ pigments which are currently available on the market. The pigments according to the invention are also characterized by oil absorption values roughly equal to one-half of those of the currently commercially available pigments having the same tones. This latter characteristic is particularly attractive: it affords the user an economic and ecological advantage since the user will be able to employ less solvent in the paints containing such oxide, while achieving the same level of viscosity.

An added advantage of the process according to the invention is the use of the sulfur oxides formed during the calcination to produce sulfuric acid. Finally, it too has the advantage of providing very high yields in respect of iron, and is otherwise quite simple and requires only inexpensive raw materials.

In order to further illustrate the present invention and the advantages thereof, the following specific examples are given, it being understood that same are intended only as illustrative and in nowise limitative. In said examples to follow, most of the monitoring and control techniques are conventional to one skilled in this art. However, certain of those techniques have been specially developed and will be described in more detail hereinafter.

In regard to the iron oxides, the operation of determining certain colorimetric characteristics is more sensitive if, instead of pigmenting a resin with pure $Fe_2O_3$, a mixture of the same $Fe_2O_3$ with a $TiO_2$ pigment in a given proportion is incorporated therein. Reference is then made to paint which is "degraded" or "shaded off" and in which, in sum, the $TiO_2$ performs the function of an agent for revealing the colorimetric characteristics of the iron oxide. The degree of shading off is defined as the ratio by weight of $Fe_2O_3/(TiO_2+Fe_2O_3)$. Comparative tests on commercially available pigments were carried out with a degree of shading off of 25%. The use of a second pigment such as $TiO_2$ in addition to the $Fe_2O_3$ is also necessary if the capacity for coloration of that $Fe_2O_3$ is to be determined. Capacity for coloration may be defined by the following relationship:

$$CC = \frac{100 \times 25}{t}$$

wherein t is the degree of shading off which has to be employed with the sample to be examined in order for the corresponding paint, which is monitored by means of a colorimeter, to have the same reflectance with a filter Y as the reference pigment to which it is compared, and which is used in a paint having a 25% degree of shading off. For example, it will be seen that, if, in order to achieve the same color intensity Y as the reference oxide which was used with 25% shading off, the sample had to be shaded off to a degree of 21%, the capacity for coloration of that sample with respect to the reference is:

$$CC = \frac{100 \times 25}{21} = 119\%$$

In qualitative terms, it can be summarized by stating that the capacity for coloration of a red sample is higher in proportion to the need to mix less thereof with a given mass of $TiO_2$, in order to achieve the same reference pink.

Another important feature of the pigment is the color difference $\Delta C$ that it presents with respect to the existing high-quality products. A novel oxide is considered to be satisfactory if, in relation to one of the existing commercial qualities, it has a color difference which does not exceed the limit corresponding to the degree of accuracy of the measurements made and the sensitivity of the eye (namely, $\Delta C$ about 1.5) and if, moreover, its capacity for coloration is greater than or equal to that of the known pigment. The color differences $\Delta C$ considered in the following examples were established in the following manner: samples of paint based on alkyd resins were prepared with a degree of shading off of 25% with each of the known oxides, and the corresponding trichromatic coordinates X, Y and Z were measured; using the same formulation, the pigment produced in accordance with the invention was incorporated into the binding agent and the reflectances were also measured, in respect of the tristimulus filters X, Y and Z. The color difference $\Delta C$ was then determined (in Mac Adam units, National Bureau of Standards, draft standard ASTM D 2244-64T) as between the sample and the various known oxides. Among the known pigments, that to which an oxide prepared in accordance with the invention can be compared was the one which was closest in regard to chromaticity, that is to say, that which had the smallest color difference with respect thereto. That search for the known pigment which was the closest to a given sample involved fairly long calculations which were advantageously carried out by means of a microcomputer. If $\Delta C$ was lower than 1.5, it was considered that the difference between the sample and the reference was insignificant, that is to say, the color purity of the sample was as good as that of the corresponding, commercially available pigment. All of the comparisons set forth in the following examples relate to pigments which were prepared in accordance with the invention, with their commercially available counterparts which were the closest thereto in terms of chromaticity. One of the particularly interesting elements in that comparison was the value of the component Z which was provided by the colorimeter, as that was characteristic of the tone of the red obtained.

With a 25% degree of shading off, the quality pigments which are commercially available at the present time cover a range of from Z=14 (for orange tones) to Z=38 (for the most purple tone).

The oil absorption values were determined in accordance with the standard AFNOR T 30-022. It will be appreciated that the figures expressing the degree of oil absorption represent the amount of oil required to produce a firm and smooth paste from 100 g of pigment.

EXAMPLE 1

The raw material used was a heptahydrated ferrous sulfate emanating from the sulfate process for the production of titanium dioxide, and was characterized by a $Mn/Fe_2O_3$ ratio of 0.63%.

The heptahydrate was dehydrated to monohydrate form in a drying oven. A solution of $K_2CO_3$ was added to the resulting powder, such that the resultant mixture had a content of 0.146 gram-atom of $K$/mole of $Fe_2O_3$. The amount of water was such that the resultant mixture generally corresponded to the formula $FeSO_4.4H_2O$. Such a mixture was first in the form of a paste which was easy to homogenize and which progressively hardened, by a process which was comparable to the setting of plaster. The solid produced upon completion of that operation was subjected to a fresh drying operation to convert it to a degree of hydration corresponding to the monohydrate. The latter was transformed into particles of a diameter of 2 to 4 mm by crushing and sifting.

The calcination operation was carried using 150 g of the granules which were obtained as indicated above, same having been placed in a container of refractory material which rotated in an electric furnace. The temperature of the furnace was programmed such that the contents of the container were heated at a temperature of 790° C. for one hour.

After cooling, the calcined mixture was placed in suspension in 700 ml of water. After agitation of the suspension, it was filtered over a Buchner filter and again washed with 700 ml of water. The cake resulting from the washing operation was itself placed in suspension, in 300 ml of water, and neutralized, under agitation, to a pH of 9 with an aqueous 10% NaOH solution.

After the mother liquors from the neutralization operation had been drained off, a final washing step using 700 ml of water was carried out over the Buchner filter.

Lastly, the washed solid was dried in a drying oven and crushed in a laboratory crusher.

The primary characteristics of the resulting pigment are reported in column e of the Table which follows, in comparison with a commercially available pigment (column h) having a similar tone.

It will be seen (line H) that the proportion of Mn was reduced from 0.63% in the raw material to 0.05% in the finished product. The latter had a capacity for coloration (line F) of 119% in comparison with its commercially available counterpart, to which a capacity for coloration of 100% was arbitrarily assigned. The chromatic difference $\Delta C=0.8$ (line E) with respect to the same counterpart was slight.

The loss of iron (line I) during the washing operation was only 1.1%.

An oil absorption value of 14 should particularly be noted, in comparison with a value of 28 for the commercial pigment.

EXAMPLES 2 TO 5

Similar preparations were produced from the same raw material as in Example 1. Only the calcination temperature and, in certain cases, the amount of alkali metal stabilizer, were altered. Such alterations are reflected in lines A and B of the Table.

By comparing the characteristics of the samples which were produced according to the invention, with those of their commercially available color counterparts, it was possible to generalize the observations made in relation to Example 1, and to draw the following conclusions:

(i) It was possible to synthesize a complete range of red $Fe_2O_3$ pigments from residual ferrous sulfate containing 0.63% $Mn/Fe_2O_3$. That range included the orange red tones (Z=14–16 with 25% shaded off paint), red tones (Z≃16–22), and purplish reds (Z≃22–36). The tones of the pigments now available on the market were faithfully reproduced.

(ii) If necessary, it was possible to exceed a temperature of 900° C. in the calcination operation without the amount of $Mn/Fe_2O_3$ exceeding 0.10% in the finished pigment.

(iii) The capacity for coloration of the samples produced by the process of the invention was at least equivalent to that of the commercially available pigments.

(iv) Their oil absorption value was markedly improved.

(v) The losses of iron during the washing operation were less than 2%.

TABLE

| Characteristics | Example 1 e | Example 1 h | Example 2 e | Example 2 h | Example 3 e | Example 3 h | Example 4 e | Example 4 h | Example 5 e | Example 5 h |
|---|---|---|---|---|---|---|---|---|---|---|
| A: Amount of $K_2O$ used | 0.146 | | 0.146 | | 0.146 | | 0.292 | | 0.292 | |
| B: Calcination temperature °C. | 790 | | 800 | | 810 | | 850 | | 940 | |
| C: Degree of shading off, in % | 21 | 25 | 21.5 | 25 | 22 | 25 | 23 | 25 | 23.3 | 25 |
| D: Trichromatic coordinate Z | 14.0 | 13.5 | 15.4 | 15.9 | 17.7 | 17.8 | 22.5 | 22.3 | 35.6 | 35.9 |
| E: Chromatic difference, $\Delta C$ | 0.8 | | 0.9 | | 0.6 | | 1.2 | | 0.8 | |
| F: Capacity for coloration, CC % | 119 | 100 | 109 | 100 | 116 | 100 | 109 | 100 | 107 | 100 |
| G: Oil absorption | 14 | 28 | 10 | 24.6 | 10 | 26 | 11 | 22 | 7 | 16 |
| H: % $Mn/Fe_2O_3$ in the finished product, by weight | 0.05 | | 0.07 | | 0.10 | | 0.9 | | 0.10 | |

TABLE -continued

|  | Example 1 | | Example 2 | | Example 3 | | Example 4 | | Example 5 | |
| --- | --- | --- | --- | --- | --- | --- | --- | --- | --- | --- |
| Characteristics | e | h | e | h | e | h | e | h | e | h |
| I: % Iron lost in the washing operation | 1.1 | | 1.0 | | 0.8 | | 1.5 | | 1.0 | | e: Sample prepared in accordance with the process of the invention.
h: Pigment which is presently commercially available and whose color is closest to the sample e prepared in the example: commercial counterpart pigment.
A: Proportion of potassium (expressed in terms of gram atom of K/mole of $Fe_2O_3$) mixed with the iron sulfate before calcination.
C: Degree of shading off t (in %) to be employed with the sample (e) to produce the same value Y as for the commercial counterpart pigment with a 25% degree of shading off (h).
D: Trichromatic coordinate Z: with t % of shading off in the case of sample e and 25% of shading off in the case of its commercial counterpart h.
E: Chromatic difference ΔC between the sample of the example (e) and its commercial counterpart (h).
F: Capacity for coloration in % of the sample (e) with respect to its commercial counterpart (h): CC = 2500/t.
G: Oil absorption (g of oil per 100 g of pigment).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of pigmentary red iron oxide, which comprises (1) calcining an intimate admixture of (i) a ferrous sulfate hydrate containing contaminating amounts of manganese value impurities and a sodium or potassium compound compound, at a temperature ranging from about 700° to 960° C., said admixture comprising from 0.08 to 1 gram-atom of alkali metal per mole of $Fe_2O_3$, and (2) washing said calcined admixture with water to remove essentially all water-soluble manganese values therefrom.

2. The process as defined by claim 1, said intimate admixture comprising (i) partially dehydrated granules of a ferrous sulfate hydrate containing contaminating amounts of manganese value impurities.

3. The process as defined by claim 1, said ferrous sulfate hydrate comprising ferrous sulfate monohydrate.

4. The process as defined by claim 3, said ferrous sulfate monohydrate comprising dehydrated ferrous sulfate heptahydrate.

5. The process as defined by claim 3, said ferrous sulfate monohydrate comprising dehydrated ferrous sulfate tetrahydrate.

6. The process as defined by claim 1, further comprising (3) drying and (4) grinding said calcined and washed admixture.

7. The process as defined by claim 1, the product iron oxide comprising at least 95% of the iron values in the starting material ferrous sulfate.

8. The process as defined by claim 7, the product iron oxide comprising at least 98.5% of the iron values in the starting material ferrous sulfate.

9. The process as defined by claim 1, the watersoluble manganese values removed comprising manganese sulfate.

10. The process as defined by claim 1, said admixture comprising from 0.08 to 0.4 gram-atom of sodium or potassium per mole of $Fe_2O_3$.

11. process as defined by claim 1, said intimate admixture comprising (ii) a sodium or potassium salt.

12. The process as defined by claim 11, the salt comprising a hydroxide, carbonate, halide, nitrate or sulfate.

13. The process as defined by claim 6, further comprising (5) micronizing said ground admixture.

14. The process as defined by claim 1, said intimate admixture further comprising reducing agent for sulfur trioxide.

15. The process as defined by claim 14, said reducing agent comprising elemental sulfur.

16. The process as defined by claim 1, wherein said step (2) the washed admixture is neutralized and again washed with water.

17. The process as defined by claim 6, said pigmentary iron oxide product being orange-red in color.

18. The process as defined by claim 6, said pigmentary iron oxide product being neutral red in color.

19. The process as defined by claim 6, said pigmentary iron oxide product being purplish red in color.

20. The product of the process as defined by claim 1.

21. The process as defined by claim 1, said ferrous sulfate hydrate (i) comprising by-product stream from sulfuric acid pickling of steel.

22. The process as defined by claim 1, said ferrous sulfate hydrate (i) comprising by-product stream from the sulfate process for production of titanium dioxide.

23. The process as defined by claim 1, said intimate admixture being granulated.

* * * * *